United States Patent [19]

Freebairn

[11] 4,049,837

[45] Sept. 20, 1977

[54] CHILL PREVENTION FOR BANANA UNDERPEEL

[75] Inventor: Hugh T. Freebairn, Houston, Tex.

[73] Assignee: Catalytic Generators, Inc., Chesapeake, Va.

[21] Appl. No.: 645,644

[22] Filed: Dec. 31, 1975

[51] Int. Cl.$^2$ .............................................. A23B 7/14
[52] U.S. Cl. .................................. 426/308; 426/323; 426/615; 427/4
[58] Field of Search ................. 426/308, 615, 323; 71/79, 127; 427/4

[56] References Cited

U.S. PATENT DOCUMENTS

| | | | |
|---|---|---|---|
| 2,084,062 | 6/1937 | Nedvidek et al. | 426/308 |
| 2,153,487 | 4/1939 | Sharma | 426/308 X |
| 2,196,164 | 4/1940 | Trowbridge et al. | 426/308 |
| 2,668,121 | 2/1954 | Rizzardi | 426/308 X |
| 2,995,538 | 8/1961 | Toulmin | 426/308 X |
| 3,262,785 | 7/1966 | Anastos | 426/308 X |

*Primary Examiner*—Harry J. Gwinnell
*Attorney, Agent, or Firm*—Francis A. Keegan

[57] ABSTRACT

A method of swelling the cell membranes of the cell surrounding the latex containing vessels in the underpeel of bananas to enable the latex vessels to be more resistant to temperatures within the range of 45° to 55° F. The method includes treating the exterior peel of the banana finger with an application of an oleaginous material having a viscosity of 10 to 10,000 centistokes, maintaining the underpeel at a temperature of above 55° F during the application and holding the underpeel for a dwell period of at least 24 hours. The amount of the oleaginous material applied is sufficient to permit the oleaginous material to penetrate completely below the exterior peel and into the sites of the latex vessels' cell membranes to swell these membranes in order to prevent both a phase change in the cell membranes and an increase in the permeability of the liquid and solutes of the cells surrounding the latex vessels into the latex contained in these vessels. The amount of the oleaginous material may be in the range of 0.01 to 1 ml per banana finger. Useful oleaginous materials include a vegetable oil, dimethyl-polysiloxane, mineral oil, mono-, di-, and tri-glycerides and phospholipids. The banana having its underpeel so treated is also described.

30 Claims, No Drawings

4,049,837

CHILL PREVENTION FOR BANANA UNDERPEEL

INTRODUCTION

The present invention relates to a product and process for enabling the underpeel of a banana skin to resist temperatures within the range of 45° to 55° F without darkening.

More particularly the present invention relates to a process and product produced thereby in which the cells lining the latex vessels are substantially altered and conditioned to prevent the otherwise inherent changes that take place at lowered temperatures and produce a darkening of the latex in the underpeel of the banana.

BACKGROUND OF THE INVENTION AND PRIOR ART

It is well recognized by the consumer who has long been educated by banana importing companies that bananas should not be put in the refrigerator. Behind this admonition is the well recognized scientific fact that physiological changes take place in the underpeel of the banana as the temperature of the underpeel is lowered below 55° F. As the temperature sinks lower the physiological changes are hastened until at temperatures, for instance between 45° the and 50° F the changes are rather quickly noticed by the eye of the observer as the rapid darkening of the underpeel takes place and this change in color shows through the exterior skin.

Those in the banana industry recognize that they must be very careful that bananas are not subjected to underpeel temperatures within the range of 45° and 55° F if they wish the bananas to be a saleable commodity. Even with the care exercised in the banana industry it does occur on occasion that through inadvertence bananas are subjected to such chilling temperatures resulting in a total loss of the bananas.

To date, no method or technique is known to the prior art which would enable the banana to withstand such chilling temperatures within the range of 45° and 55° F and accordingly greater care and vigilance is imposed. The solution to the basic problem has yet to be found.

It is important, to understand fully the present invention, to place the damage produced in the underpeel of the banana due to chilling temperatures of 45° to 55° F in the proper perspective. The present invention is simply concerned with enabling the underpeel of the banana to resist the ravaging affects of these chilling temperatures and is not related in any manner to prior well known methods and techniques for preventing frost damage to fruits and vegetables. It must be made clear why the chilling damage to bananas is not common amongst other fruits and vegetables.

The banana is a substantially unique fruit due to the presence of the latex vessels which ironically are in the underpeel for the ostensible purpose of protecting the banana from foreign bodies and organisms upon breaching the integrity of the outer skin. The latex present in the latex vessels is designed to exude from any break in the exterior skin to prevent the entrance of any foreign body or organism through the break. The banana although a tropical product is at times subjected to chilling temperatures below 55° F from which follows the characteristic darkening.

It has now been discovered that these chilling temperatures also appear to bring about a phase change around the latex vessels in the underpeel. The phase change is found to occur in the cell membranes lining the latex vessels producing an increase in the permeability of these cell membranes for the liquid and solutes present in the cells surrounding latex vessels. The liquid and solutes from these cells then come into contact with the latex contained within the latex vessels and in a rather complex interreaction this latex darkens.

These changes are in contrast to those physical and chemical changes that take place when a fruit is frozen or subjected to heavy frost producing temperatures. Frost damage has been defined previously in the art as the U.S. Pat. No. 2,961,798 wherein it is maintained that the term designates damage due to sub-freezing temperatures, i.e. lower than 32° F. Many fruits, vegetables including plants, leaves, stalks, buds, flowers and alike are adversely affected by such frost damage occurring only at temperatures lower than 32° F. However, the banana underpeel is one of a very few parts of a plant that is rendered commercially useless at range 45 ° to 55° F. This distinctive characteristic of the banana is contrasted by the fact that many plants at these temperatures particularly fruits and vegetables are purposely maintained to achieve a longer storage life.

The banana being a very temperature sensitive fruit, it is clear that there is no purpose whatever in attempting to protect it from frost damage. The simple reason is that long before the banana has been subjected to frost damage the underpeel would have been irreparably damaged by the chilling temperatures of 45° to 55° F. The illogic of applying any of the frost damage prevention techniques to bananas must therefore be manifest. The banana would be useless before any frost protection means was operable.

The prior art is limited to the use of oils and waxes including silicone oil for the purpose of preventing frost damage usually on living plants and their products. Generally the frost damage protection techniques relate to citrus trees which grow in the southern part of the United States and which may be subjected to occasional frosts. Bananas, indigenous only to a very few countries throughout the world, pose a completely different problem due to the unique presence of latex vessels and their great sensitivity to chilling at higher temperatures.

Many of the prior art patents relating to frost damage disclose various oils and waxes most of which, such as parafin wax, would be totally useless when applied to the banana due to the total failure to penetrate to the latex vessels.

No prior art treatment for temperature damage in any range is known. Toulmin U.S. Pat. No. 2,995,538 however, does disclose a treatment for bananas which provides a flexible and tough coating to prevent deterioration and injury due to mechanical abrasion. This protective coating is external only and utilizes specific siloxane resins that would be incapable of penetrating into the underpeel at the sites of the latex vessels. To achieve the abrasion protective coating this patented disclosure would necessarily require a coating that would cover and remain on the exterior skin rather than penetrate through and into the underpeel.

OBJECTS OF THE PRESENT INVENTION

It is the principal object of the present invention to provide a protection for the underpeel of a banana to enable it to withstand chilling and destructive temperatures of 45° to 55° F.

Another object of the present invention is to provide a process and the product thereof in which the underpeel of the banana is prevented from darkening at chill damage temperatures.

A further object of the present invention is the provision of a method and product produced for causing swelling in the cell membranes surrounding the latex vessels inhibit an otherwise normal phase change from taking place at chill damage temperatures in order to avoid the darkening of the latex.

A further object of the present invention is to provide method and a product which enables bananas to pass more easily through the channels of trade to the consumer without fear of the destructive effects of chilling temperatures.

These and other objects of the present invention will become more readily apparent upon careful consideration of the following specification.

SUMMARY OF THE PRESENT INVENTION

The present invention is a method of swelling cell membranes of cells surrounding the latex containing vessels in the underpeel of bananas to enable these latex vessels to be more resistant to temperatures within the range of 45° to 55° F. An oleaginous material having a specified viscosity is applied to the exterior peel while the underpeel is maintained at a temperature above 55° during the application for a dwell period of at least 24 hours to permit substantially all of the oleanginous material to penetrate below the exterior peel and into the sites of the latex vessel cell membranes to swell the membranes to prevent both a phase change in the cell membranes and an increase in the permeability for the liquid and solutes of the cells surrounding latex vessels into the latex contained in these vessels.

The product of the present invention is the underpeel of a banana skin in which the cell membranes lining the latex vessels are swelled by the oleaginous material that has penetrated the exterior skin. The oleaginous material may be a vegetable oil, mineral oil, or a mono-, di-, tri-glyceride, phospholipid or dimethyl polysiloxane.

DISCRIPTION OF THE PREFERRED ENBODIMENT

The banana is known to possess an underpeel which is located about 1/16 to 1/8 of an inch below the surface of the exterior skin. This underpeel contains many of the somewhat unique latex vessels containing latex that is the cause of the darkening when the underpeel obtains a temperature between the range of 45° and 55° F. The precise structure and formation of the latex vessels are not clear but their presence has been clearly determined. Lining these latex vessels are cell membranes which are normally substantially impenetrable by the liquids and solutes normally present in the cells formed by the cell membranes. As long as the cell membranes maintain the latex in the latex vessels and the liquids and solutes in the cells separate there apparently is no interaction that produces the characteristic darkening and the totally undesirable banana incapable of commercial sale.

It has been found the cell membranes undergo a phase change at temperatures of 55° and below. The lower the temperature the more rapid and complete the phase change. During the phase change within the cell membranes, it is believed that the liquid-crystalline structure undergoes a transition to a solid-gel phase which has greater permeability for the liquids and solutes in the cell surrounded by the cell membrane. This greater permeability permits the intermixing of the cell contents into the latext vessels resulting in the darkening of the latex.

It has now been discovered in accordance with the present invention that an oleaginous material when applied at temperatures above 55° F followed by a proper dwell time will upon application to the exterior skin of the banana penetrate substantially completely down to the sites of the latex vessels and cause a swelling of the cell membranes lining these latex vessels. The swelling of the cell membranes has been found to change the electron-spin resonance in the cell membranes and decreases the cell membrane permeability to contained phosphate ions.

The change in the electron-spin resonance and the decreased cell membrane permeability to contained phosphate ions by reason of the presence of the oleaginous material are detectable and measurable characteristics of the cell membrane. These are achieved solely due to the presence of the oleaginous material. The cell membrane so changed in its characteristics is now found to be capable of withstanding temperatures that would otherwise be considered to be in the chill damaging range.

The oleaginous material that are useful to achieve the purposes of the present invention include the saturated and unsaturated oils that may be broadly classed as mono-, di-, and tri-glycerides. Typical of the type of oils found useful are oils derived from the soybean, cotton seed, olive, corn, peanut, safflower, linseed, tung and coconut. These and other oils may also be referred to as vegetable oils.

Other oleaginous materials include all types and grades of mineral oil, and dimethyl polysiloxane. The molecular size or chain length of the dimethyl polysiloxane oil is neither critical nor important. The viscosity of the dimethyl polysiloxane should be in a range from 10 centistokes to 10,000 centistokes with a preferred range of 200 to 500 centistokes.

Phospholipids may also be used in the practice of the invention. The term phospholipid includes a number of materials within the broader class of complex lipids.

Useful phospholipids are lecithin, cephanlin and sphingomyelin. Also phosphatidyl, phasmalogen and their derivatives with choline, ethanolamine serine and inositol may be used.

These phospholipids are generally similar to an oily wax and may have to be mixed with one of the other oleaginous materials if not sufficiently liquid. A 10 to 50% mixture by weight with mineral oil for example is acceptable. The total amount of the oleaginous material is the combination of both these ingredients.

The oleaginous material maybe applied in any manner such as spraying, brushing, dipping, or the like to the exterior skin of each banana finger. The oleaginous material may be in aqueous emulsion or with a suitable aromatic solvent. The oil and water emulsion may be achieved in any manner well known in the art and may include surfactants and emulsifying agents to effect a homogeneous aqueous emulsion. Suitable surfactants may include, sodium lauryl sulfonate for example or any one of a number of other esters of higher fatty acids.

The amount of the oleaginous material that is to be applied to the exterior skin of the banana should be in a range of 0.01 to 1 ml per banana finger. Preferably, the amount may be in the range of 0.1 to 0.5 ml per banana finger. It has been found that the amount that is applied is not critical provided that sufficient amount of the oleaginous material is present to penetrate below the exterior peel and into the site of the latex vessels cell membranes to achieve the swelling of the membranes.

In order to achieve the proper penetration of the oleaginous material through the exterior skin and down into the underpeel at the sites of the latex vessel cell membranes, it has been found that the underpeel must be maintained at a temperature above about 55° F during the application and thereafter there must be a holding or dwell period of at least 24 hours with a preferable time of at least 3 days with 4 to 7 days the most preferable dwell period. After the proper dwell period the exterior skin is found to be substantially free of any applied oleaginous material and does not constitute a coating on top of the exterior skin but rather an impregnation deep into the underpeel of the banana skin.

In a specific example of the present invention Valery variety bananas were treated at 60° F with a safflower oil by spraying the safflower seed oil onto the exterior skin of the bananas in an amount calculated to be approximately 0.3 ml per banana finger. The bananas were held for 4 days after which the banana was subjected to temperatures as low as 50° for 6 hours. Untreated bananas were also subjected to the same temperature for the same length of time and the control bananas were found to have darkened while the treated bananas were free of darkening. The same test was conducted with bananas of differing maturity with similar results. Similar tests were conducted with immature bananas on the tree in tropical countries and protection was obtained.

The underpeel of the treated bananas was examined and the cell membranes of the latex vessels were found to have swelled due to the presence of the safflower seed oil. Little or no indication on the exterior skin of the presence of safflower seed oil was found indicating that substantially all of the oil had found the sites of the latex vessels cell membranes.

The electron-spin resonance of the cell membranes was found to have changed due to the presence of the oleaginous material and differed from the electron-spin resonance of the untreated bananas. Further tests indicated that the permeability of the membranes was lessened with respect to phosphate ions contained in the cells. The treated bananas in contrast to the control bananas were found to have no phase change occurring in the cell membrane. It was determined that this was a reason for preventing the liquids and solutes in the cells from intermixing with the latex in the latex vessels and prevented the darkening from occurring in the control bananas.

It should be understood that the scope of the present invention is limited solely by the appended claims.

I claim:

1. A method of swelling the cell membranes of the cells surrounding the latex containing vessels in the underpeel of bananas to enable these latex vessels to be more resistant to temperatures within the range of 45° to 55° F, the method comprising, treating the exterior peel of a banana finger with an application of an oleaginous material having a viscosity of 10 to 10,000 centistokes, maintaining the temperature of the underpeel above 55° F during said application and holding the underpeel for a dwell period of at least 24 hours, applying a sufficient amount of said oleaginous material to permit said oleaginous material to penetrate below the exterior peel and into the sites of the latex vessel cell membranes to thereby swell said membranes in order to prevent both a phase change in the cell membranes and an increase in the permeability for the liquid and solutes of the cells surrounding the latex vessels into the latex contained in these vessels.

2. The process of claim 1 wherein the amount of said oleaginous material is in the range of 0.01 to 1 ml per banana finger.

3. The process of claim 2 wherein the amount of said oleaginous material is in the range of 0.1 to 0.5 ml per banana finger.

4. The process of claim 1 wherein said dwell time is at least 3 days.

5. The process of claim 1 wherein the electron-spin resonance in the cell membranes is changed and the cell membrane permeability to phosphate ions is decreased.

6. The process of claim 1 wherein said oleaginous material is a vegetable oil.

7. The process of claim 1 wherein said oleaginous material is dimethyl polysiloxane.

8. The process of claim 1 wherein said oleaginous material is mineral oil.

9. The process of claim 1 wherein said oleaginous material is selected from the group consisting of mono-, di- and tri-glycerides and phospholipids.

10. The process of claim 1 wherein the amount of said oleaginous material is in the range of 0.01 to 1 ml per banana finger and said dwell time is at least 3 days.

11. The process of claim 10 including changing the electron-spin resonance in the cell membranes and decreasing the cell membrane permeability to phosphate ions.

12. The process of claim 10 wherein said oleaginous material is a vegetable oil.

13. The process of claim 11 wherein said oleaginous material is a vegetable oil.

14. The process of claim 11 wherein said oleaginous material is dimethyl polysiloxane.

15. The process of claim 11 wherein said oleaginous material is a mineral oil.

16. The process of claim 11 wherein said oleaginous material is selected from the group consisting of mono-, di- and tri-glycerides and phospholipids.

17. A banana having an underpeel having latex vessels containing latex and cell membranes lining the latex vessels, wherein the underpeel withstands temperatures within the temperature range of 45° to 55° F without darkening, said cell membranes being swelled and containing an oleaginous material, said oleaginous material present in said cell membranes in an amount sufficient to produce swelling, change the electron-spin resonance of said cell membranes and lessen the permeability of said cell membranes to ions within the cells, thereby preventing a phase change in said cell membranes when at a cell membrane temperature in said temperature range.

18. The product of claim 17 wherein the amount of said oleaginous material is in the range of 0.1 to 0.5 ml per banana finger.

19. The product of claim 17 wherein said oleaginous material is substantially completely in the underpeel of the banana and at least about 1/16 inch below the exterior peel skin.

20. The product of claim 17 wherein said oleaginous material is a vegetable oil.

21. The product of claim 17 wherein said oleaginous material is dimethyl polysiloxane.

22. The product of claim 17 wherein said oleaginous material is a mineral oil.

23. The product of claim 17 wherein said oleaginous material is selected from the group consisting of mono-, di- and tri-glycerides and phospholipids.

24. The product of claim 17 wherein the amount of said oleaginous material is in the range of 0.1 and 0.5 ml per banana finger and said oleaginous material is substantially completely in the underpeel of the banana and at least about 1/16 inch below the exterior peel skin.

25. The product of claim 24 wherein said oleaginous material is a vegetable oil.

26. The product of claim 24 wherein said oleaginous material is dimethyl polysiloxane.

27. The product of claim 24 wherein said oleaginous material is a mineral oil.

28. The product of claim 24 wherein said oleaginous material is selected from the group consisting of mono-, di- and tri-glycerides and phospholipids.

29. The product of claim 17 wherein the oleaginous material is a phospholipid.

30. The product of claim 24 wherein the oleaginous material is a phospholipid.

* * * * *